(12) United States Patent
Mitani et al.

(10) Patent No.: US 6,715,318 B2
(45) Date of Patent: Apr. 6, 2004

(54) GLASS SUBSTRATE FOR INFORMATION RECORDING MEDIA AND MANUFACTURING METHOD THEREOF

(75) Inventors: Kazuishi Mitani, Hyogo (JP); Yasuhiro Saito, Takatuki (JP); Tatsuro Umeyama, Mie (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 166 days.

(21) Appl. No.: 09/973,495

(22) Filed: Oct. 9, 2001

(65) Prior Publication Data

US 2002/0064620 A1 May 30, 2002

(30) Foreign Application Priority Data

Oct. 11, 2000 (JP) .......................................... 2000-310477

(51) Int. Cl.$^7$ .............................................. C03C 19/00
(52) U.S. Cl. ............................... 65/30.1; 65/31; 451/41
(58) Field of Search ................................ 451/41; 65/30.1, 65/31

(56) References Cited

U.S. PATENT DOCUMENTS 6,287,175 B1 * 9/2001 Marukawa et al. ........... 451/41
6,509,412 B1 * 1/2003 Hall ........................... 525/92 D

FOREIGN PATENT DOCUMENTS

JP    2000-53450 A    2/2000
JP    2000-149249 A   5/2000

OTHER PUBLICATIONS

Machine Translation of JP 2000–149249, May, 2000.*

Machine Translation of JP 2000–053450, Feb., 2000.*

* cited by examiner

Primary Examiner—James Derrington
(74) Attorney, Agent, or Firm—Frishauf, Holtz, Goodman & Chick, P.C.

(57) ABSTRACT

There are provided a glass substrate for information recording media in which the undulations on the glass substrate surface are optimized, thus contributing to reduction of the flying height, and at the same time preventing the occurrence of head crashes and thermal asperity, and a method of manufacturing the glass substrate. At least one surface of a glass substrate is polished, and the polished at least one surface of the glass substrate is subjected to surface scrubbing using a sponge having an Asker C hardness of not less than 40 according to The Society of Rubber Industry, Japan SRIS 0101.

8 Claims, 4 Drawing Sheets

GLASS SUBSTRATE FOR INFORMATION RECORDING MEDIA AND MANUFACTURING METHOD THEREOF

BACKGROUND OF THE INVENTION

1. Field of the Invention

The present invention relates to a glass substrate for information recording media and a manufacturing method thereof, and in particular to a glass substrate for information recording media used in information recording devices such as a hard disk drive and a manufacturing method thereof.

2. Prior Art

In recent years, there has been remarkable progress in digitalization of information, and various types of information recording device for recording such digital information have been developed and manufactured. These devices are being improved at a rapid rate, with the information storage capacity and the recording and playback speeds increasing at a rate of over 10% per year. The most widely used information recording devices are currently hard disk drives, and the rate of improvement of hard disk drives is faster than that of other devices.

In a hard disk drive, recording and playback of information is carried out to and from an information recording layer formed on an information recording medium substrate (hereinafter merely referred to as the "substrate") using a magnetic head. Types of hard disk drive that are widely used at present are "CSS (contact start/stop) type" and "ramp load type". In the CSS type, the magnetic head flies over a data zone of the substrate while the substrate is rotating, and slides over a CSS zone of the substrate when the substrate starts or stops moving. The CSS zone of the substrate is a portion of the substrate (generally provided along the inside perimeter or the outside perimeter of the substrate) on which uniform undulations of height several tens of nm are intentionally provided. In the ramp load type, the magnetic head flies over the substrate while the substrate is rotating, and is stored in a storage position when the substrate stops. With the ramp load type, because of the setup involved, a CSS zone is not needed. Moreover, in recent years, studies have been carried out into a contact type hard disk drive in which the magnetic head and the substrate are always in contact with one another.

In CSS type and ramp load type hard disk drives, while the substrate is rotating, the magnetic head flies over the substrate with a gap (hereinafter referred to as the 'flying height') between the magnetic head and the substrate surface (information recording region) of several tens of nm. To realize a high recording density, it is necessary to reduce the flying height. However, if the surface undulations of the substrate are large, then the magnetic head will collide with projections on the substrate surface during rotation, increasing the possibility of a head crash occurring. Moreover, even before a head crash occurs, there is a risk of occurrence of so-called thermal asperity, in which heat caused by such collisions results in the magnetic head detecting an abnormal signal and hence malfunctioning. In particular, in recent times high-sensitivity MR heads and GMR heads have become the mainstream, and as a result the problem of thermal asperity has become yet more serious.

Conventionally, it was thought that head crashes and thermal asperity caused by collisions between the magnetic head and projections on the substrate surface could be avoided by reducing the undulations on the substrate surface in the information recording region, and thus that the higher the surface smoothness, the better the performance of the substrate. Representative examples of methods that have been proposed for removing surface undulations and forming a smooth surface include a method in which a smooth substrate is formed by carrying out finishing polishing using artificial suede, i.e. by removing a surface layer (Japanese Laid-open Patent Publication (Kokai) No. 2000-53450), and a method in which surface scrubbing is carried out using a sponge made of PVA or the like, thus removing foreign matter and surface undulations and hence smoothing the substrate (Japanese Laid-open Patent Publication (Kokai) No. 2000-149249).

However, there are problems with the conventional art such as the following.

Through detailed studies, the present inventors have discovered that the frequency of occurrence of head crashes can indeed be reduced by increasing the surface smoothness of the substrate, but that if the surface undulations are made too small, then the flight stability of the magnetic head drops, resulting in the frequency of collisions between the magnetic head and the substrate surface increasing, and hence in the risk of occurrence of a head crash increasing. The cause of this drop in the flight stability of the magnetic head is not clear, but it is thought that it is because the magnetic head wobbles as it flies over the information recording region, resulting in contact with the substrate being unavoidable, and hence in the frictional force rising unless there are moderate surface undulations (hereinafter referred to as "texture"). In particular, nowadays the flying height is set very low to increase the recording density, and hence it is thought that head crashes caused by wobbling of the magnetic head are yet more prone to occur. It is thus necessary to ensure that the magnetic head is not subjected to an excessive resistance when the flying magnetic head contacts the substrate. Moderately roughening (hereinafter referred to as "texturing") the substrate surface can be envisaged as a means for achieving this.

However, with a substrate that has been subjected to texturing, there is a problem in that it is difficult to selectively remove abnormal projections or foreign matter attached to the substrate surface. For example, if surface scrubbing is carried out using a soft sponge such as a polyvinyl formal sponge or a polyurethane sponge, then it is difficult to remove abnormal projections that have been formed during the texturing or foreign matter attached firmly to the substrate surface, and if the abnormal projections are forcibly removed under harsh scrubbing conditions of a long time, a high pressure and a high speed of rotation, then the texture itself may be excessively worn down. Moreover, in the case of polishing using a polishing machine or finishing polishing, there is a problem in that the substrate surface is removed, and hence the texture may again be excessively worn down.

SUMMARY OF THE INVENTION

In view of the problems described above, it is an object of the present invention to provide a glass substrate for information recording media in which the undulations on the glass substrate surface are optimized, thus contributing to reduction of the flying height, and at the same time preventing the occurrence of head crashes and thermal asperity, and a method of manufacturing the glass substrate.

To attain the above object, the present invention provides a method of manufacturing a glass substrate for an information recording medium, comprising the steps of polishing at least one surface of a glass substrate, and subjecting the polished at least one surface of the glass substrate to surface scrubbing using a sponge having an Asker C hardness of not less than 40 according to The Society of Rubber Industry, Japan SRIS 0101.

According to the method of the present invention, at least one polished surface of a glass substrate is subjected to surface scrubbing using a sponge having an Asker C hardness of not less than 40 according to The Society of Rubber Industry, Japan Standard SRIS 0101. As a result, the advantages of a sponge resulting from the part where the sponge comes into contact with the glass substrate being hard on a microscopic scale but pliant on a macroscopic scale, namely the advantages that the glass substrate is not easily scratched even if foreign matter is present, and any slight loss of parallelity between the sponge and the glass substrate is mitigated by the pliancy of the sponge are retained, and abnormal projections caused by ununiform etching of the glass substrate and firmly attached foreign matter can be removed, and hence a texture free of abnormal projections and having a uniform projection height can be produced. As a result, when the glass substrate is used as the substrate of an information recording medium, the flying height can be reduced, and the occurrence of head crashes and thermal asperity can be prevented.

Preferably, the sponge comprises an underlayer and a surface layer, with the Asker C hardness of the surface layer being not less than 40. As a result, the above-mentioned effects according to the present invention can be exhibited reliably.

More preferably, the surface layer of the sponge comprises a resin having a 100% modulus of not less than 45 kg. As a result, abnormal projections can be removed without excessively wearing down the texture on the glass substrate surface.

Still more preferably, the resin is a polycarbonate type polyurethane resin. As a result, the chemical resistance of the sponge can be improved.

Preferably, the sponge has a surface layer comprising a spongy body having a mean opening diameter of not less than 30 $\mu$m. As a result, abnormal projections can be removed well without excessively wearing down the texture on the glass substrate surface.

Preferably, the surface scrubbing is carried out using an alkaline aqueous solution of not less than 8 pH. As a result, electrostatic repulsive forces act between the removed abnormal projections and the glass substrate, and hence reattachment of the removed abnormal projections can be prevented.

Preferably, the surface scrubbing is carried out using an acidic aqueous solution of not more than 5 pH. As a result, metallic impurities can be dissolved effectively and hence removed.

Preferably, the surface scrubbing is carried out on the at least one surface of the glass substrate after the at least one surface of the glass substrate has been subjected to texturing. As a result, abnormal projections can be removed more reliably.

More preferably, the at least one surface of the glass substrate that has been subjected to the surface scrubbing is then subjected to chemical strengthening. As a result, a high-strength glass substrate having a compressive stress layer formed on the at least one surface thereof can be produced.

Also preferably, the surface scrubbing is carried out on the at least one surface of the glass substrate after the at least one surface of the glass substrate has been subjected to texturing and chemical strengthening in this order. As a result, the texture formed on the at least one substrate surface can be prevented from being excessively worn down during polishing using a polishing machine or finishing polishing.

To attain the above object, the present invention also provides a glass substrate for an information recording medium manufactured using the method according to the present invention as described above, wherein a bearing height BH04 of at least one surface of the glass substrate at which a contact ratio is 0.4% as measured using an atomic force microscope is in a range of 2 to 7 $\mu$m.

According to this glass substrate for information recording media, the bearing height BH04 of at least one surface of the glass substrate at which the contact ratio is 0.4% as measured using an atomic force microscope is in a range of 2 to 7 $\mu$m. As a result, a texture free of abnormal projections and having a uniform projection height can be produced, and hence when the glass substrate is used as the substrate of an information recording medium, the flying height can be reduced, and the occurrence of head crashes and thermal asperity can be prevented.

To attain the above object, the present invention also provides a glass substrate for an information recording medium manufactured using the method according to the present invention as described above, wherein a bearing height BH01 of at least one surface of the glass substrate at which a contact ratio is 0.1% as measured using an atomic force microscope is in a range of 2 to 10 $\mu$m.

According to this glass substrate for information recording media, the bearing height BH01 of at least one of the glass substrate at which the contact ratio is 0.1% as measured using an atomic force microscope is in a range of 2 to 10 $\mu$m. As a result, a texture free of abnormal projections and having a uniform projection height can be produced, and hence when the glass substrate is used as the substrate of an information recording medium, the flying height can be reduced, and the occurrence of head crashes and thermal asperity can be prevented.

The above and other objects, features and advantages of the invention will become more apparent from the following detailed description taken in conjunction with the accompanying drawings.

BRIEF DESCRIPTION OF THE DRAWINGS

FIG. 1A shows a case in which cap-shaped flat-faced sponges are used;

FIG. 1B shows a case in which roller-shaped sponges are used;

FIG. 2A shows the undulations on the glass substrate surface;

FIG. 2B is a sectional view taken along line A—A in FIG. 2A;

FIG. 2C is a sectional view taken along line B—B in FIG. 2A;

DETAILED DESCRIPTION OF PREFERRED EMBODIMENTS

Embodiments of the glass substrate and manufacturing method thereof according to the present invention will now be described in detail. It should be noted, however, that the present invention is not limited to these embodiments.

The glass substrate according to the embodiments of the present invention is used as a substrate for an information recording medium used in an information recording device such as a hard disk drive. There are no particular limitations on the type of the parent material of the substrate. It is possible to use, for example, an aluminum alloy, carbon, glass, crystallized glass, a plastic such as a polycarbonate-olefin, or silicone, as used conventionally. Out of these, it is preferable to use a glass or crystallized glass that has high surface smoothness, is easily subjected to surface processing, and has high elastic modulus, rigidity and strength as the parent material of the glass substrate according to the embodiments of the present invention. Moreover, there are no particular limitations with regard to modifying a surface layer of the glass substrate, although it is preferable, for example, for the glass substrate surface to have a compressive stress layer formed thereon by chemical strengthening.

The texturing of the glass substrate can be carried out using a known mechanical polishing method, with the operational conditions controlled more precisely than usual. However, in the case of a glass substrate having a glass or a crystallized glass as the parent material thereof, the texturing can be carried out more simply by roughening the glass substrate surface by etching. When etching, in theory the surface of a multi-component glass substrate should be etched uniformly and abnormal projections (projections that are abnormally high compared with the surrounding minute projections) should not be formed. However, in actuality there may be abnormal projections on the surface of the glass substrate after the etching has been carried out. The reason for this is that in general the composition of the surface layer of a glass substrate is not necessarily uniform on a microscopic scale, and moreover during polishing the abrasive grains are pushed strongly against the glass substrate surface and may adhere thereto or become embedded therein, and hence in such places it will be as if the glass substrate surface is capped. There may thus be parts of the glass substrate surface that are easily dissolved by the etching solution and parts that are not so easily dissolved, and as a result the etching may proceed ununiformly, and hence abnormal projections may arise. A glass substrate surface that has been textured has an undulating shape as shown by reference numeral 1 in FIG. 2A, described later.

Such abnormal projections can be suppressed by suitably adjusting chemical treatment conditions and conditions of polishing carried out before the chemical treatment. However, if surface scrubbing is carried out after the texturing, then the abnormal projections can be removed more reliably. In the present invention, it was discovered that by carrying out surface scrubbing using a sponge having a surface (i.e. the part of the sponge that comes into contact with the glass substrate) that is hard on a microscopic scale but pliant on a macroscopic scale, abnormal projections can be preferentially removed while utilizing advantages of a sponge, namely advantages such as the glass substrate tending not to be scratched even if foreign matter is present, and any slight loss of parallelity between the sponge and the glass substrate being mitigated by the pliancy of the sponge.

The surface scrubbing will now be described in more detail.

Placement of Surface Scrubbing Step Relative to Other Manufacturing Steps

There are no particular limitations on when the surface scrubbing is carried out, provided it is after the texturing.

Surface Scrubbing Method and Device

Figure 1A:
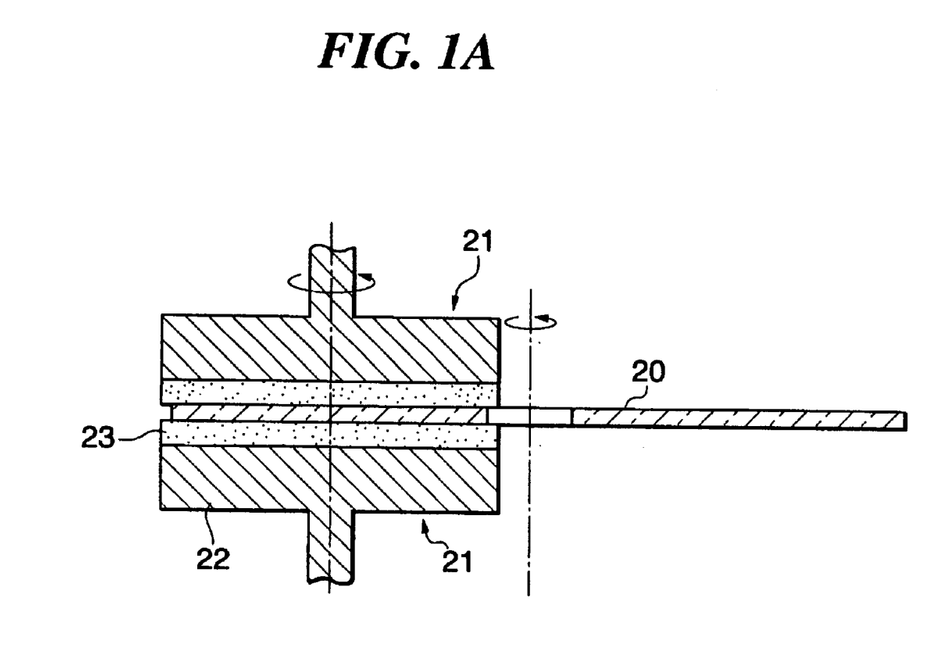
FIGS. 1A and 1B are schematic views useful in explaining surface scrubbing methods; specifically.
Figure 1B:
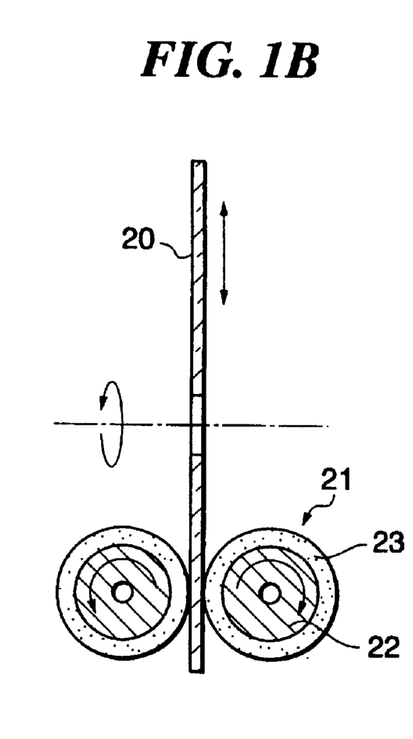

There are no particular limitations on the method and device used for scrubbing the glass substrate surfaces; it is possible to use a commercially sold surface scrubbing device. For example, FIGS. 1A and 1B show schematic views useful in explaining possible surface scrubbing methods. In FIG. 1A, a sponge 21 is formed of a pair of pair of cap-shaped flat-faced sponges, and a disk-shaped glass substrate 20 that has been subjected to texturing is interposed between the pair of cap-shaped flat-faced sponges 21, and the glass substrate 20 and the sponges 21 are rotated. Moreover, the sponge 21 may also be roller-shaped brush sponges as shown in FIG. 1B, in which case the glass substrate 20 and the sponges 21 are rotated and/or moved back and forth as shown by the arrows in FIG. 1B.

Sponges Used in the Surface Scrubbing

The surface of each sponge used in the surface scrubbing preferably has an Asker C hardness as stipulated in The Society of Rubber Industry, Japan Standard SRIS 0101 of 40 or more, so that abnormal projections can be removed from the glass substrate surface well. It is more preferable that the Asker C hardness of the sponge surface should be 40 or more. Then, by suitably adjusting the surface scrubbing conditions, the abnormal projections can be removed well without excessively wearing down the texture. As shown in FIGS. 1A and 1B, each sponge may be comprised of a surface layer 23 that is made of a resin and acts as a polishing pad, and an underlayer 22 (the part other than the surface layer). There are no particular limitations on the material type, hardness, thickness and number of laminations of the underlayer 22. Moreover, there are no particular limitations on the method of bonding the surface layer 23 and the underlayer 22 together. The surface layer 23 may be formed directly onto the underlayer 22, or the underlayer 22 and the surface layer 23 may be formed separately and then bonded together using double-sided adhesive tape or the like.

There are no particular limitations on the type of resin that constitutes the surface layer 23, but it is preferable for the 100% modulus of the resin to be 45 kg or more, since then by suitably adjusting the surface scrubbing conditions, abnormal projections can be removed from the glass substrate surface without excessively wearing down the texture. It is presumed that this is because if the 100% modulus of the resin is 45 kg or more, then the surface layer 23 is hard on a microscopic scale, and hence the ability to remove abnormal projections is enhanced. From the viewpoint of cleanliness, a urethane resin is preferably used as the material of the surface layer 23. In the case of a urethane resin, if the type of the resin is fixed, then the larger the 100% modulus, the larger the proportion of hard crystalline parts (i.e. the lower the proportion of soft non-crystalline parts). If the 100% modulus is large, the surface layer 23 is thus hard on a microscopic scale. Moreover, there are various types of urethane resin depending on the starting materials, with representative examples including polyester type polyurethanes, polyether type polyurethanes and polycarbonate type polyurethanes. Polycarbonate type polyurethanes have better chemical resistance than polyester type polyurethanes and polyether type polyurethanes, and hence a polycarbonate type polyurethane is preferable from the viewpoint of maintaining the microscopic hardness of the sponge surface during use with an alkaline solution or the like.

There are no particular limitations on the structure of the surface layer 23, so long as it is a spongy body. It is preferable for a spongy body having a mean opening diameter of 30 to 200 $\mu$m, more preferably about 80 $\mu$m, to be used, since then abnormal projections can be removed from the glass substrate surface well without excessively wearing down the texture. The reason why the abnormal projections can be selectively removed in this case is not well understood, but it is presumed that it is because if the mean opening diameter is 30 $\mu$m or more, then the sponge surface contacts the abnormal projections efficiently during the scrubbing. Furthermore, if the mean opening diameter is 200 $\mu$m or less, then contact between the abnormal projections and the surface layer 23 is efficient. Moreover, there are no particular limitations on the thickness of the spongy body when the spongy body is formed as having a mean opening diameter of 30 to 200 $\mu$m, but when the surface of the spongy body is shaved off to have the openings exposed, the thickness of the surface layer of the sponge becomes 0.3 to 1.0 mm.

Scrubbing Liquid

The surface scrubbing described above is preferably carried out using a scrubbing liquid. There are no particular limitations on the scrubbing liquid, with it being possible to use pure water, electrolytically ionized water, ozonized water, hydrogen-added water, an acidic aqueous solution, an alkaline aqueous solution, or any of the above with one or more chelating agents, surfactants and/or salts added.

When removing abnormal projections caused by ununiform etching, it is preferable to use an alkaline aqueous solution that chemically attacks the bonds in the glass. Using an alkaline aqueous solution is also preferable because then electrostatic repulsive forces act between the removed abnormal projections and the glass substrate, and hence reattachment of the removed abnormal projections is prevented. There are no particular limitations on the concentration of the alkaline aqueous solution, but from the viewpoint of process control the pH is preferably at least 8, more preferably 12 to 14.

When removing metallic contaminants, it is preferable to use an acidic aqueous solution that dissolves metals.

There are no particular limitations on the temperature of the scrubbing liquid, but in consideration of the effects of evaporation of the liquid and the like, the scrubbing liquid should be generally used in a temperature range of about 10 to 50° C.

The surface scrubbing according to the present invention may be carried out on a surface of the glass substrate after the surface of the glass substrate has been subjected to texturing, and then the surface of the glass substrate may be subjected to chemical strengthening after the surface scrubbing.

Alternatively, the surface scrubbing may be carried out on a surface of the glass substrate after the surface of the glass substrate has been subjected to texturing and chemical strengthening in this order.

Furthermore, the surface scrubbing according to the present invention can also be carried out on a glass substrate that has not been textured, to effectively remove undulations, foreign matter and/or soiling.

An information recording medium is formed by depositing in order at least an underlayer, a magnetic layer and a protective film on the glass substrate that has been subjected to surface scrubbing as described above. If necessary, a seed layer may be provided between the glass substrate and the underlayer, and buffer layers or shielding layers may be provided after each layer, thus forming a multilayer structure.

The information recording medium thus obtained can be incorporated into an information recording device such as a hard disk drive using known methods. There are no particular limitations on the types or thicknesses of the above-mentioned underlayer, magnetic layer and protective film, or on the deposition means. When a glass substrate is used, from the viewpoint of securing good information recording and playback characteristics and good film adhesion, it is preferable to use NiAl as a seed layer and a Co alloy as the underlayer. Sputtering is generally used as the deposition means, in which case the shape of the surface undulations on the glass substrate remains as it is. Moreover, by carrying out tape burnishing after the film deposition, foreign matter attached to the protective film can be removed. Because the shape of the undulations on the glass substrate surface remains as it is in the completed information recording medium, problems such as head crashes and thermal asperity are not prone to occur even if the flying height is reduced.

As described above, surface scrubbing is carried out to solve the problems of head crashes and thermal asperity. The thus optimized shape of the undulations on the glass substrate surface is evaluated using a predetermined criterion. Examples of evaluation criteria for the shape of the undulations on the glass substrate surface include the average surface roughness Ra and the ten points average height Rz, but in the present invention the bearing height is used as described below.

The bearing height will now be described with reference to FIGS. 2A to 2C.

Figure 2A:
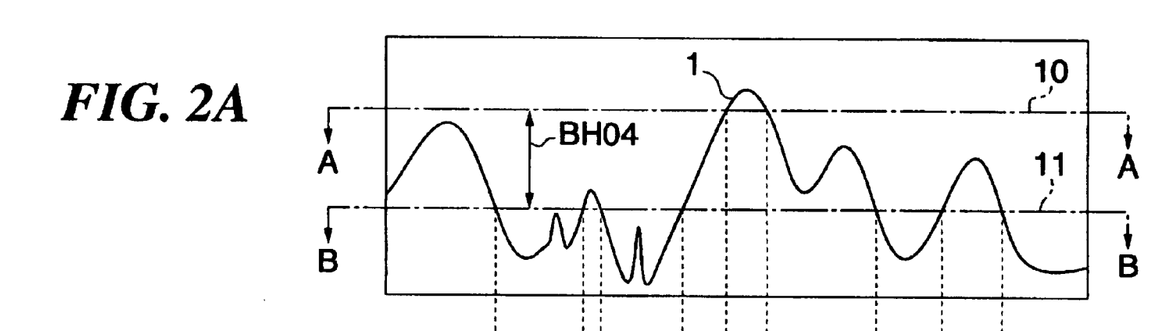
FIGS. 2A to 2C are schematic views of undulations on a glass substrate surface that has been subjected to texturing; specifically.
Figure 2B:
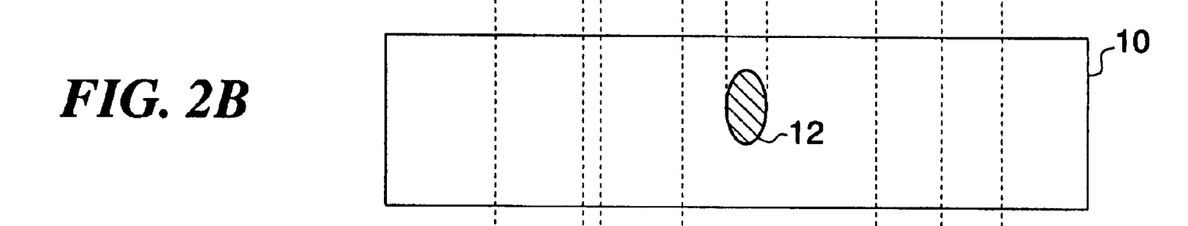
Figure 2C:
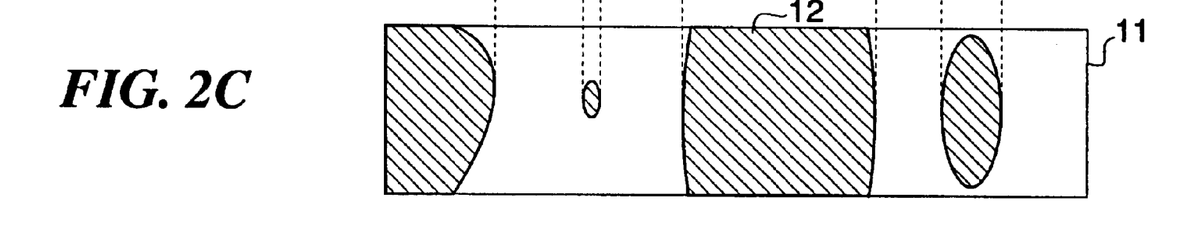

FIGS. 2A to 2C are schematic views of undulations on a glass substrate surface that has been subjected to texturing. Specifically, FIG. 2A shows the undulations on the glass substrate surface, FIG. 2B is a sectional view taken along line A—A in FIG. 2A, and FIG. 2C is a sectional view taken along line B—B in FIG. 2A.

In FIGS. 2A to 2C, reference numeral 1 indicates the shape of the undulations on the glass substrate surface, reference numeral 10 indicates a slicing plane at which the bearing ratio is 0.4%, reference numeral 11 indicates a slicing plane (reference plane) at which the bearing ratio is 50%, and reference numeral 12 indicates the cross section of a projection on the glass substrate surface at a slicing plane.

With the bearing height, only the projections on the surface of the glass substrate are focused upon, and using a criterion for evaluating the shape of the projections, the undulations on the surface of the glass substrate are evaluated. Specifically, the height at which the contact ratio of the undulations on the glass substrate surface is 50% is taken as a reference height, and whether or not the distance from the reference height up to a bearing height at which the contact ratio is 0.4% (this distance is hereinafter referred to as "BH04") is in a range of 2 to 7 $\mu$m is taken as the evaluation criterion. Here, the contact ratio is a value represented by the bearing ratio, and is measured using an atomic force microscope (AFM). The bearing ratio is a proportion of a slicing plane occupied by the cross sections of projections on the glass substrate surface, the slicing plane being a plane along which the glass substrate surface is sliced. For example, when the contact ratio (bearing ratio) is 50%, the cross sections of projections occupy half of the slicing plane (see FIG. 2C). The slicing plane at which the contact ratio is 50% is taken as a reference plane. As the slicing plane is shifted from the reference plane parallelly toward the tips of the projections, the contact ratio gradually drops. The distance up until the contact ratio becomes 0.4% (see FIG. 2B) is BH04. It was discovered that if the distance that the slicing plane moves from where the contact ratio is 50% to where the contact ratio is 0.4% is in a range of 2 to 7 µm, then the glass substrate is such that the problems of head crashes and thermal asperity can be solved.

Figure 3:
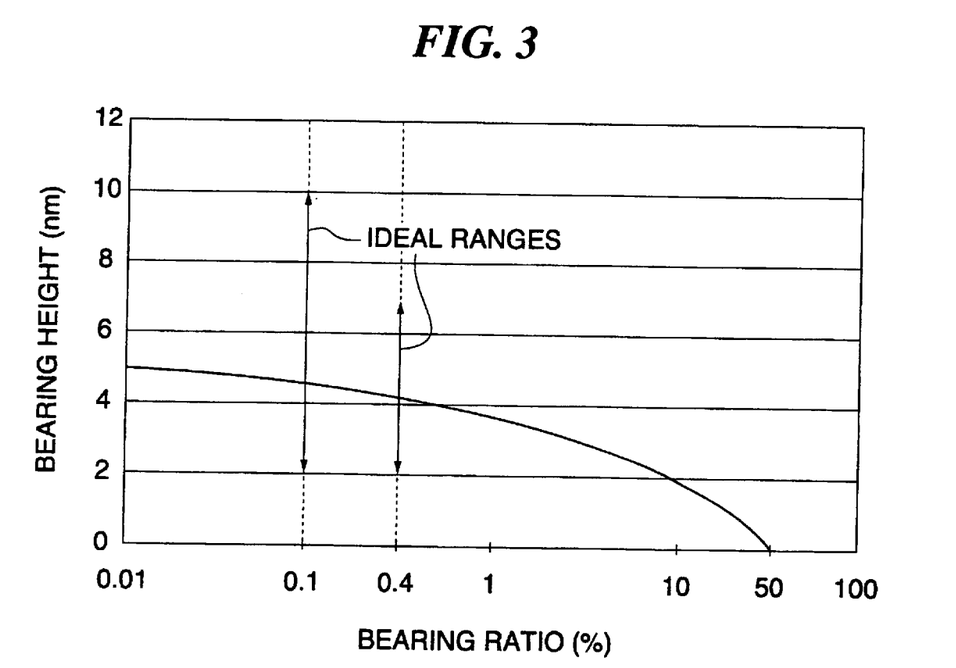
FIG. 3 is a graph showing a typical relationship between bearing ratio and bearing height.

FIG. 3 is a graph showing the typical relationship between the bearing ratio and the bearing height in the present invention.

Figure 4:
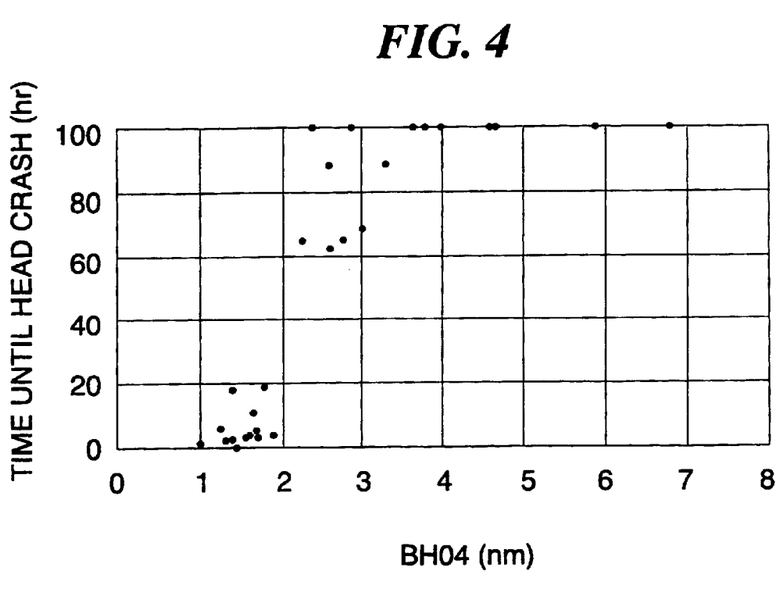
FIG. 4 is a diagram showing the correlation between BH04 and time until a head crash occurs.

The present inventors are the first to discover and introduce this evaluation criterion with regard to the shape of the undulations on a glass substrate surface, after carrying out numerous experiments and analyzing the results thereof. Specifically, the present inventors carried out detailed comparative studies into the characteristics of contact between a magnetic head and a glass substrate surface and the flight stability of the magnetic head, and as a result discovered that the bearing height of the glass substrate surface is a parameter that is directly related to the flight stability of the magnetic head. The present inventors manufactured many information recording media having different BH04s, and carried out magnetic head fixed point floating tests under a reduced pressure of 26.7 kPa (200 Torr). Some of the results are shown in FIG. 4. In general, the flying height drops as the ambient pressure drops, and hence contact between the magnetic head and the glass substrate is more prone to occur under reduced pressure. Tests under reduced pressure are thus regarded as a type of acceleration test to facilitate determination of head crash resistance.

In the case of CSS type hard disk drives, various studies have been carried out into the shape of undulations on the glass substrate surface in the past, and optimal ranges of various parameters such as Ra(average surface rough), Rmax(maximum surface rough), the maximum projection height Rp, the projection density and the projection size have been proposed. Here, the maximum projection height Rp is the maximum height of the projections observed in a measurement area of 20 µm×20 µm.

However, the purpose of these studies has been to carry out optimization with regard to friction and wear in the CSS zone, and consideration was not given to flight stability or thermal asperity during low flight of the magnetic head in the data zone.

As shown in FIG. 4, there is a boundary at a BH04 of 2 nm, with a head crash occurring within a few hours if the BHO4 is less than 2 nm. It is thought that this is because the flight stability of the magnetic head suddenly drops if the BH04 falls below 2 nm. On the other hand, if the BH04 exceeds 7 nm, then the probability of head crashes occurring due to collision of the magnetic head with jutting out projections increases, and the frequency of occurrence of thermal asperity also rises.

The BH04 is more preferably in a range of 3 to 6.5 nm, with 3.5 to 6.0 µm being ideal. The reason for making the lower limit 3 or 3.5 nm is that a foreign matter removal process called tape burnishing is carried out when making a glass substrate as described above into an information recording medium, and hence an allowance should be left for this. By setting the lower limit slightly high in this way, the production yield of glass substrates having a target performance increases. On the other hand, by setting the lower limit to be low, the frequency of occurrence of head crashes can be reduced even if the design value of the flying height is low. Moreover, the reliability of the information recording medium under a harsh environment such as low atmospheric pressure in alpine regions can be improved.

Furthermore, the shape of the undulations on the glass substrate surface is preferably such that the height (BH01) at which the contact ratio is 0.1% relative to the reference height at which the contact ratio is 50% is in a range of 2 to 10 nm. This is because the probability of occurrence of head crashes increases if the BH01 exceeds 10 nm, as shown in the examples described below. Note that BH01≧BH04 in general.

The present invention will now be described more specifically through examples and comparative examples.

EXAMPLE 1

Glass substrates for information recording media shown in Table 1 were manufactured through the following steps.

TABLE 1

| | | SURFACE SCRUBBING CONDITIONS SPONGE TYPE | | | | | | |
|---|---|---|---|---|---|---|---|---|
| | | SURFACE LAYER | | | | UNDERLAYER | | |
| | | RESIN TYPE | HARDNESS ASKER C | THICKNESS mm | MEAN OPENING DIAMETER µm | 100% MODULUS kg | RESIN TYPE | HARDNESS ASKER C | THICKNESS mm |
| EXAMPLES | 1 | POLYCARBONATE TYPE POLYURETHANE | 75 | 0.4~0.6 | 50~60 | 200 | POLYESTER TYPE POLYURETHANE | 15~20 | 10 |
| | 2 | POLYCARBONATE TYPE POLYURETHANE | 40 | 0.4~0.6 | 50~60 | 50 | POLYESTER TYPE POLYURETHANE | 15~20 | 10 |
| | 3 | POLYCARBONATE TYPE POLYURETHANE | 70 | 0.4~0.6 | 50~60 | 130 | POLYESTER TYPE POLYURETHANE | 15~20 | 10 |
| | 4 | POLYCARBONATE TYPE POLYURETHANE | 85 | 0.4~0.6 | 50~60 | 250 | POLYESTER TYPE POLYURETHANE | 15~20 | 10 |
| | 5 | POLYCARBONATE TYPE POLYURETHANE | 75 | 0.4~0.6 | 20 | 200 | POLYESTER TYPE POLYURETHANE | 15~20 | 10 |
| | 6 | POLYCARBONATE TYPE POLYURETHANE | 75 | 0.4~0.6 | 100 | 200 | POLYESTER TYPE POLYURETHANE | 15~20 | 10 |
| | 7 | POLYESTER TYPE POLYURETHANE | 75 | 0.4~0.6 | 50~60 | 200 | POLYESTER TYPE POLYURETHANE | 15~20 | 10 |
| | 8 | POLYETHER TYPE POLYURETHANE | 75 | 0.4~0.6 | 50~60 | 200 | POLYESTER TYPE POLYURETHANE | 15~20 | 10 |
| | 9 | POLYCARBONATE TYPE POLYURETHANE | 75 | 0.4~0.6 | 50~60 | 200 | POLYESTER TYPE POLYURETHANE | 15~20 | 0.5 |
| | 10 | POLYCARBONATE TYPE POLYURETHANE | 75 | 0.4~0.6 | 50~60 | 200 | POLYESTER TYPE POLYURETHANE | 15~20 | 20 |

TABLE 1-continued

| | | | | | | | | | | |
|---|---|---|---|---|---|---|---|---|---|---|
| | 11 | POLYCARBONATE TYPE POLYURETHANE | 75 | 0.4~0.6 | 50~60 | 200 | POLYESTER TYPE POLYURETHANE | 30~40~ | 10 |
| | 12 | POLYCARBONATE TYPE POLYURETHANE | 75 | 0.4~0.6 | 50~60 | 200 | POLYESTER TYPE POLYURETHANE | 15~20 | 10 |
| | 13 | POLYCARBONATE TYPE POLYURETHANE (ASKER C 70, THICKNESS 10mm) | | | | | | | |
| | 14 | POLYCARBONATE TYPE POLYURETHANE | 75 | 0.4~0.6 | 50~60 | 200 | POLYESTER TYPE POLYURETHANE | 15~20 | 10 |
| COMPARATIVE EXAMPLES | 1 | PVF (ASKER C 5~10, THICKNESS 10 mm) | | | | | | | |
| | 2 | PVF (ASKER C 5~10, THICKNESS 10 mm) | | | | | | | |
| | 3 | POLYCARBONATE TYPE POLYURETHANE | 15 | 0.4~0.6 | 55 | 30 | POLYESTER TYPE POLYURETHANE | 15~35 | 10 |

| | | SURFACE SCRUBBING CONDITIONS | | | | EVALUATION OF SURFACE SHAPE | | | EVALUATION OF MEDIUM CHARACTERISTICS | | |
|---|---|---|---|---|---|---|---|---|---|---|---|
| | | | | | | | PROJECTIONS NO. OF PROJECTIONS PER 0.01 mm$^2$ | | FIXED POINT FLOATING | | CONTINUOUS SEEKING |
| | | SCRUBBING LIQUID | ROTATION SPEED | PRESSURE | TIME | Rp | | TEXTURE | SCRATCHES | HEAD CRASHES | HEAD CRASHES |
| | | mass % | rpm | gf/cm$^2$ | sec | mm | 20 nm / 10 nm | BH04 | *1 | *2 | *3 |
| EXAMPLES | 1 | 1% KOH | 400 | 100 | 20 | 4.5 | 0 / 0 | 3.5 | NO | NO | NO |
| | 2 | 1% KOH | 400 | 100 | 20 | 9.0 | 0 / 0 | 4.1 | NO | NO | NO |
| | 3 | 1% KOH | 400 | 100 | 20 | 4.8 | 0 / 0 | 3.7 | NO | NO | NO |
| | 4 | 1% KOH | 400 | 100 | 20 | 4.1 | 0 / 0 | 3.1 | NO | NO | NO |
| | 5 | 1% KOH | 400 | 100 | 20 | 8.5 | 0 / 0 | 3.6 | NO | NO | NO |
| | 6 | 1% KOH | 400 | 100 | 20 | 4.5 | 0 / 0 | 3.3 | NO | NO | NO |
| | 7 | 1% KOH | 400 | 100 | 20 | 4.9 | 0 / 0 | 3.6 | NO | NO | NO |
| | 8 | 1% KOH | 400 | 100 | 20 | 5.0 | 0 / 0 | 3.7 | NO | NO | NO |
| | 9 | 1% KOH | 400 | 100 | 20 | 4.3 | 0 / 0 | 3.4 | NO | NO | NO |
| | 10 | 1% KOH | 400 | 100 | 20 | 5.1 | 0 / 0 | 3.6 | NO | NO | NO |
| | 11 | 1% KOH | 400 | 100 | 20 | 4.4 | 0 / 0 | 3.4 | NO | NO | NO |
| | 12 | 0.01% HF | 400 | 100 | 20 | 5.0 | 0 / 0 | 4.5 | NO | NO | NO |
| | 13 | 1% KOH | 400 | 100 | 20 | 9.5 | 0 / 0 | 4.3 | NO | NO | NO |
| | 14 | 1% KOH | 400 | 100 | 20 | 4.3 | 0 / 0 | 3.4 | NO | NO | NO |
| COMPARATIVE EXAMPLES | 1 | 1% KOH | 400 | 100 | 20 | 30.2 | 11 / 71 | 7.3 | YES | NO | — |
| | 2 | 10% KOH | 700 | 500 | 800 | 10.3 | 1 / 3 | 1.6 | YES | YES | — |
| | 3 | 1% KOH | 400 | 100 | 20 | 23.1 | 2 / 42 | 7.2 | YES | NO | — |

*1: Presence/absence of scratches/soiling after fixed point floating test (24 hours) under reduced pressure
*2: Presence/absence of head crashes during fixed point floating test (24 hours) under reduced pressure
*3: Presence/absence of head crashes during 1000-hour drive test Machining Step A donut-shaped disk of outside diameter 65 mm and inside diameter 20 mm was cut out from a piece of aluminosilicate glass (SiO$_2$: 65.0 mol %, Al$_2$O$_3$: 10.0 mol %, Li: 8.0 mol %, Na$_2$O: 8.8 mol %, MgO: 2.4 mol %, CaO: 3.6 mol %, K$_2$O: 0.2 mol %, SrO: 2.0 mol %) of thickness 1.0 mm.

Polishing Steps

The donut-shaped disk was subjected to lapping using an established method with alumina abrasive grains, polishing and final polishing steps. This surface polishing was carried out to a thickness of 0.6 mm. In the final polishing, the polishing was carried out using an abrasive ("Mirek" made by Mitsui Mining & Smelting Co.) containing cerium oxide (CeO$_2$) and a suede pad (Bellatrix made by Kanebo, Ltd.). The maximum projection height Rp of the glass substrate surface after these steps was 56.8 nm.

Washing and Texturing Steps

Abrasive weakly attached to the glass substrate surface was removed by washing in a pure water shower, and then the glass substrate was immersed for 2.5 minutes in a 0.01 mass % hydrogen fluoride solution bath held at 50° C. while irradiating with ultrasound at about 48 kHz and 1 W/cm$^2$. The glass substrate was then immersed for 2.5 minutes in a commercially sold alkaline solution (pH11; RB25 made by Chemical Products Co. Ltd.) bath held at 40° C. while irradiating with ultrasound at about 48 kHz and 1 W/cm$^2$. The glass substrate was then taken out of the alkaline solution bath, and the alkaline solution was removed by immersing the glass substrate in a pure water bath. Finally, the glass substrate was rinsed three times in a pure water bath, immersed in an isopropyl alcohol bath for 2 minutes while irradiating with ultrasound at about 48 kHz, and then dried for 1 minute in isopropyl alcohol vapor. The maximum projection height Rp of the glass substrate surface after these steps was 35.9 nm.

Chemical Strengthening Step

The glass substrate was immersed for 3 hours in a mixed molten salt of 40 mass % grade 1 sodium nitrate and 60 mass % grade 1 potassium nitrate in mole fraction held at 380° C., thus carrying out chemical strengthening through ion exchange. Once the chemical strengthening had been completed, the glass substrate was cooled slowly, and then strengthening salt attached to the glass substrate was washed off in a pure water bath. The maximum projection height Rp of the glass substrate surface after the chemical strengthening was 36.5 nm.

Surface Scrubbing Step (Removal of Abnormal Projections)

Scrubbing was next carried out using cap-shaped flat-faced scrubbing sponges each of which had a polycarbonate type polyurethane resin surface layer (Asker C hardness 75, 100% modulus of resin 200 kg, mean opening diameter 50 to 60 μm, thickness 0.6 mm, spongy body type) bonded onto a urethane sponge (Asker hardness 10, thickness 10 mm) using a double-sided tape. During the scrubbing, the speed of rotation of the sponges was 400 rpm, and the pressure at which the sponges were pushed was 9800 Pa (100 gf/cm$^2$); a 1 mass % potassium hydroxide (KOH) aqueous solution of pH11 was fed in from the central part of the rotating sponges at a rate of 30 ml per minute. The scrubbing was carried out for 20 seconds Final Washing Step The glass substrate was next immersed for 2.5 minutes in a commercially sold alkaline solution (pH11; RB25 made by Chemical Products) bath held at 40° C. while irradiating with ultrasound at about 48 kHz and 1 W/cm$^2$. The glass substrate was then taken out of the alkaline solution bath, and the alkaline solution was removed by immersing in a pure water bath. Finally, the glass substrate was rinsed 3 times in a pure water bath, immersed in an isopropyl alcohol bath for 2 minutes while irradiating with ultrasound at about 48 kHz, and then dried for 2 minutes in isopropyl alcohol vapor.

Film Deposition Step

An NiAl seed layer, a CrMo underlayer, a CoCrPt magnetic layer and a Carbon-type protective film were formed in this order on the glass substrate by sputtering. A perfluoropolyether type lubricant layer was then formed by immersion, thus completing the manufacture of the information recording medium.

EXAMPLES 2 to 4

In Examples 2, 3 and 4, processing was carried out under the same conditions as in Example 1, but only the Asker hardness of the sponge surface layer used in the surface scrubbing step was 40 (Example 2), 70 (Example 3) or 85 (Example 4).

EXAMPLES 5 AND 6

In Examples 5 and 6, processing was carried out under the same conditions as in Example 1, but only the mean opening diameter of the sponge surface layer used in the surface scrubbing step was 20 μm (Example 5) or 100 μm (Example 6).

EXAMPLES 7 And 8

In Examples 7 and 8, processing was carried out under the same conditions as in Example 1, but only the sponge surface layer used in the surface scrubbing step was made of a polyester type polyurethane resin (Example 7) or a polyether type polyurethane resin (Example 8).

EXAMPLES 9 AND 10

In Examples 9 and 10, processing was carried out under the same conditions as in Example 1, but only the thickness of the urethane sponge underlayer used in the surface scrubbing step was 0.5 mm (Example 9) or 20 mm (Example 10).

EXAMPLE 11

In Example 11, processing was carried out under the same conditions as in Example 1, but only the hardness (Asker C) of the urethane sponge underlayer used in the surface scrubbing step was 30 to 40.

EXAMPLE 12

In Example 12, processing was carried out under the same conditions as in Example 1, but only the scrubbing liquid used in the surface scrubbing step was a 0.01 mass % hydrofluoric acid (HF) aqueous solution of pH3.

EXAMPLE 13

In Example 13, processing was carried out under the same conditions as in Example 1, but only the sponge used in the surface scrubbing step did not have an underlayer and the hardness (Asker C) of the sponge was 70.

EXAMPLE 14

In Example 14, processing was carried out under the same conditions as in Example 1, but only the chemical strengthening was not carried out.

Comparative Example 1

In Comparative Example 1, processing was carried out under the same conditions as in Example 1, but only the sponge used in the surface scrubbing step was a PVF sponge having a thickness of 10 mm and a hardness (ASKER C) of 5 to 10.

Comparative Example 2

In Comparative Example 2, processing was carried out under the same conditions as in Comparative Example 1, but only the scrubbing conditions were 10 mass % KOH, 700 rpm, 500 gf/cm$^2$ and 800 sec.

Comparative Example 3

In Comparative Example 3, processing was carried out under the same conditions as in Example 1, but only the hardness (Asker C) of the sponge surface layer used in the surface scrubbing step was 15.

Evaluation of the Shape of the Glass Substrate Surface

The abnormal projections and texture on the glass substrates of Examples 1 to 14 and Comparative Examples 1 to 3 described above were measured using a scanning probe microscope (AFM) (Nanoscope IIIa made by Digital Instruments Inc.) in tapping mode. As parameters of the abnormal projections, the maximum projection height Rp, the number of projections of height 20 nm, and the number of projections of height 10 nm were measured. Here, the maximum projection height Rp represents the maximum projection height observed within a measurement area of 20 μm×20 μm. The number of projections of height 10 nm and the number of projections of height 20 nm represent the numbers of projections of these heights in the measurement area, but adjustment was carried out in view of the existence probability of such projections being low such that the total AFM visual field area was 0.01 mm$^2$.

As a parameter of the texture, the bearing height BH04 of the surface undulations of the glass substrate was used; this is the height at which the contact ratio is 0.4%, with the height at which the contact ratio is 50% being taken as the reference height. As mentioned above, the contact ratio is a value represented by the bearing ratio. The bearing ratio is the proportion of the slicing plane occupied by the cross sections of projections on the glass substrate surface, the slicing plane being a plane along which the glass substrate surface is sliced. Taking the slicing plane at which the contact ratio is 50% as a reference plane, as the slicing plane is shifted from the reference plane parallelly toward the tips of the projections, the contact ratio gradually drops. The distance up until the contact ratio becomes 0.4% is BH04.

As described above, the present inventors have discovered that the bearing height of the glass substrate surface is a parameter that is directly related to the flight stability of the magnetic head (i.e. the magnetic head not coming into contact with the glass substrate surface during flight), and that the probability of head crashes occurring and the frequency of thermal asperity occurring increase if the BH04 is less than 2 nm or greater than 7 nm. It is presumed that the flight stability of the magnetic head drops suddenly if the BH04 drops below 2 nm, and that the probability of head crashes occurring due to collisions between the magnetic head and jutting out projections increases if the BH04 exceeds 7 nm. The present inventors manufactured many information recording media having different BH04s, and carried out magnetic head fixed point floating tests under a reduced pressure of 26.7 kPa (200 Torr) on these information recording media; results are shown in FIG. 4.

Evaluation of Performance of Information Recording Media

A 24-hour fixed point floating test was carried out under a reduced pressure of 26.7 kPa (200 Torr) on each of the information recording media. Moreover, after the test, the magnetic head and the surface of the information recording medium were inspected using an optical microscope, and it was checked whether or not there were scratches and soiling.

In cases in which no crashes occurred during the 24-hour fixed point floating test and no scratches or soiling was found on the magnetic head or the surface of the information recording medium after the test, the information recording medium was then incorporated into a hard disk drive following an established method, a 1000-hour continuous seek test was carried out at a flying height of 15 nm and a rotation speed of 1000 rpm, and it was investigated whether or not there were head crashes. The results of all of the tests are shown in Table 1.

From Examples 1 to 14, it can be seen that if the hardness (Asker C) of the sponge used in the surface scrubbing step is 40 or more, then a texture of even height is obtained in which there are no 10 nm-high or 20 nm-high projections, the Rp value is no more than 10 nm, and the BH04 is 2 to 7 nm. Moreover, in this case, when the glass substrate is made into an information recording medium, head crashes do not occur, and no scratches or soiling is found on the magnetic head or the surface of the information recording medium after the tests. From these results, it can be seen that an information recording medium glass substrate that does not cause head crashes or thermal asperity can be obtained even if an acidic aqueous solution is used in the surface scrubbing step (Example 12), even if the sponge has no underlayer (Example 13), or even if chemical strengthening is not carried out (Example 14).

From Comparative Example 1, it can be seen that if the sponge used in the surface scrubbing step is a PVF sponge, then abnormal projections cannot be removed. The BH04 also becomes greater than 7 nm, and hence when the glass substrate is made into an information recording medium, scratches occur on the magnetic head or the information recording medium during the fixed point floating test.

From Comparative Example 2, it can be seen that if scrubbing is carried out excessively using a PVF sponge, then the number of abnormal projections is reduced, but the texture itself is also worn away excessively, whereby the BH04 becomes less than 2 nm. Moreover, when the glass substrate is made into an information recording medium, head crashes occur during the fixed point floating test.

Comparing Examples 1 to 14 and Comparative Example 3, it can be seen that the abnormal projections cannot be removed if the hardness (Asker C) of the sponge surface layer used in the surface scrubbing step is less than 40. In this case, the BH04 also becomes greater than 7 nm, and hence when the glass substrate is made into an information recording medium, scratches occur on the magnetic head or the information recording medium during the fixed point floating test.

Comparing Examples 1 to 4, it can be seen that if the 100% modulus of the surface layer resin of the sponge used in the surface scrubbing step is 45 kg or more, then a good texture with no 10 nm-high or 20 nm-high projections can be obtained, and that if the 100% modulus is 130 kg or more, then a texture having a yet more even height with an Rp value of no more than 5 nm can be obtained.

Comparing Examples 5 and 6, it can be seen that if the mean opening diameter of the surface layer of the sponge used in the surface scrubbing step is 20 $\mu$m or more, then a texture having an even height with no 10 nm-high or 20 nm-high projections and an Rp value of no more than 10 nm can be obtained, and that if the mean opening diameter is 50 $\mu$m or more, then a texture having a yet more even height with an Rp value of no more than 5 nm can be obtained.

Comparing Examples 1, 7 and 8, it can be seen that if a polycarbonate type polyurethane resin is used as the surface layer of the sponge used in the surface scrubbing step, then a texture having an even height can be produced, with the Rp value being reduced more than when a polyether type or polyester type polyurethane resin is used.

What is claimed is:

1. A method of manufacturing a substrate for an information recording medium, comprising:
   polishing at least one surface of a glass substrate; and
   subjecting the polished at least one surface of the glass substrate to surface scrubbing using a sponge having an Asker C hardness of not less than 40 according to The Society of Rubber Industry, Japan SRIS 0101;
   wherein the sponge comprises an underlayer and a surface layer, and the Asker C hardness of the surface layer is not less than 40; and
   wherein the surface layer of the sponge comprises a resin having a 100% modulus of not less than 45 kg.

2. A method as claimed in claim 1, wherein the resin is a polycarbonate type polyurethane resin.

3. A method of manufacturing a substrate for an information recording medium, comprising:
   polishing at least one surface of a glass substrate; and
   subjecting the polished at least one surface of the glass substrate to surface scrubbing using a sponge having an Asker C hardness of not less than 40 according to The Society of Rubber Industry, Japan SRIS 0101;
   wherein the surface layer of the sponge comprises a spongy body having a mean opening diameter of not less than 30 $\mu$m.

4. A method as claimed in claim 1, wherein the surface scrubbing is carried out using an alkaline aqueous solution having a pH of not less than 8.

5. A method of manufacturing a substrate for an information recording medium, comprising:
   polishing at least one surface of a glass substrate; and
   subjecting the polished at least one surface of the glass substrate to surface scrubbing using a sponge having an Asker C hardness of not less than 40 according to The Society of Rubber Industry, Japan SRIS 0101;
   wherein the surface scrubbing is carried out using an acidic aqueous solution having a pH of not more than 5.

6. A method as claimed in claim 1, further comprising subjecting the at least one surface of the glass substrate to texturing before the surface scrubbing is carried out on the at least one surface of the glass substrate.

7. A method as claimed in claim 6, further comprising subjecting the at least one surface of the glass substrate to chemical strengthening after the surface scrubbing has been carried out on the at least one surface of the glass substrate.

8. A method as claimed in claim 1, further comprising subjecting the at least one surface of the glass substrate to texturing and then to chemical strengthening before the surface scrubbing is carried out on the at least one surface of the glass surface.

* * * * *